(12) United States Patent
Kovar et al.

(10) Patent No.: US 7,151,124 B2
(45) Date of Patent: Dec. 19, 2006

(54) ENZYME DEGRADABLE CURABLE RESIN COMPOSITIONS

(75) Inventors: Robert F. Kovar, Wrentham, MA (US); Nese Orbey, Acton, MA (US)

(73) Assignee: Foster-Miller, Inc., Waltham, MA (US)

( * ) Notice: Subject to any disclaimer, the term of this patent is extended or adjusted under 35 U.S.C. 154(b) by 462 days.

(21) Appl. No.: 09/912,258

(22) Filed: Jul. 24, 2001

(65) Prior Publication Data

US 2002/0037960 A1 Mar. 28, 2002

Related U.S. Application Data

(60) Provisional application No. 60/220,617, filed on Jul. 25, 2000.

(51) Int. Cl.
*C08F 2/46* (2006.01)

(52) U.S. Cl. .................................................. 522/104

(58) Field of Classification Search ................ 528/280, 528/281, 282, 276, 277, 50, 55, 56, 66, 73; 522/24, 60, 66, 71, 81, 104, 105
See application file for complete search history.

(56) References Cited

U.S. PATENT DOCUMENTS

| | | | | |
|---|---|---|---|---|
| 3,010,918 A | 11/1961 | Ikeda | ........................ | 260/17 |
| 3,010,923 A | 11/1961 | Ikeda | ........................ | 260/23 |
| 3,055,766 A | 9/1962 | Reinhardt | .................... | 106/287 |
| 3,058,933 A | 10/1962 | Ikeda | ........................ | 260/17 |
| 3,245,927 A | 4/1966 | Ikeda | ........................ | 260/23 |
| 4,055,549 A | 10/1977 | Roberts | | |
| 4,086,294 A | 4/1978 | Koleske et al. | | |
| 4,096,125 A | 6/1978 | Smith et al. | | |
| 4,137,279 A | 1/1979 | Smith et al. | | |
| 4,264,757 A | 4/1981 | Park | | |
| 4,372,311 A | 2/1983 | Potts | | |
| 4,503,098 A | 3/1985 | Potts | | |
| 4,532,296 A | 7/1985 | Gardner | | |
| 4,532,297 A | 7/1985 | Gardner | | |
| 4,556,693 A | 12/1985 | Corcoran et al. | | |
| 4,618,635 A | 10/1986 | Osborn et al. | | |
| 4,751,112 A | 6/1988 | Smith, Jr. et al. | | |
| 4,814,361 A | 3/1989 | Koleske et al. | | |
| 5,977,269 A * | 11/1999 | Kovar et al. | ................. | 526/148 |
| 6,150,429 A * | 11/2000 | Kovar et al. | ................... | 522/60 |
| 6,300,457 B1 * | 10/2001 | Rubin et al. | ................... | 528/66 |

OTHER PUBLICATIONS

Nishida, et al., "*Distribution of Poly(β-hydroxybutyrate) and Poly(ε-caprolactone) Aerobic Degrading Microorganisms in Different Environments*," Journal of Environmental Polymer Degradation, 1:227-233 (1993).
Benedict, et al., "*Fungal Degradation of Polycaprolactones*," Journal of Applied Polymer Science, 28:327-334 (1983).
Benedict, et al., "*Polycaprolactone Degradation by Mixed and Pure Cultures of Bacteria and a Yeast*," Journal of Applied Polymer Science, 28:335-342 (1983).
Tokiwa, et al., "*Biodegradation of Synthetic Polymers Containing Ester Bonds*," The American Chemical Society, pp. 136-148 (1990).
Potts, et al., "*An Investigation of the Biodegradability of Packaging Plastics*," U.S. Environmental Protection Agency, Washington, DC, REP. EPA-R2-72-046 (1972).

* cited by examiner

*Primary Examiner*—Robert D. Harlan
(74) *Attorney, Agent, or Firm*—David G. Conlin; Linda M. Buckley; Edwards Angell Palmer & Dodge, LLP (57) ABSTRACT

The present invention provides degradable curable resin compositions containing no or essentially no volatile organic components. Oligomers for forming the coating compositions of the present invention are vinyl dioxolane end-capped oligomers having an enzyme degradable segment.

40 Claims, 5 Drawing Sheets

*IR spectra of PCLVD synthesis*

ENZYME DEGRADABLE CURABLE RESIN COMPOSITIONS

CROSS-REFERENCE TO RELATED APPLICATION

This application claims the benfit of U.S. Provisional Application No. 60/220,617, filed Jul. 25, 2000.

STATEMENT OF GOVERNMENT INTEREST

Funding for the present invention was obtained from the Government of the United States by virtue of Contract No. 68-D-98-134 from the U.S. Environmental Protection Agency. Thus, the Government of the United States has certain rights in and to the invention claimed herein.

FIELD OF THE INVENTION

This invention relates to curable resin coating, adhesive and sealant compositions that contain no or essentially no volatile organic components (VOCs). In particular, the curable resins of this invention comprise an enzyme degradable vinyl dioxolane end-capped oligomer.

BACKGROUND OF THE INVENTION

Curable resins are suitable for a variety of applications. For example, curable resins have been used as coatings, sealants and adhesives, and in producing molded articles. The manufacturing facilities that utilize conventional curable resins in their operations are typically expensive to maintain due to the nature of these resins. Conventional curable resins are typically solvent-based and contain volatile organic components (VOCs). VOCs favorably affect the viscosity of curable resins, and often VOCs are added so as to make the curable resin composition sprayable. This is a particularly desired quality for coating applications (e.g. furniture, automobile, ship and other transportation vehicle coating applications). However, during the application and cure of these conventional resin compositions, substantial amounts of VOCs are released into the atmosphere. This is a serious problem because VOCs are toxic, flammable, explosive, smog-producing and noxious. As a result, elaborate and expensive fire and explosion-prevention measures, worker protection measures and pollution control equipment are required during the use of such conventional resins.

An additional cost is generated when aged and damaged cured resins are stripped and replaced with fresh curable resins. In the past, methylene chloride based chemical strippers were used to remove cured resins, but the use of these strippers has now been prohibited by the EPA. Alternatively, a number of other solvent-based stripping agents have been used. However, such solvent-based stripping agents require expensive pollution control equipment. In addition, the disposal of the removed resin and the solvent-based stripping agent further impacts the environment and increases costs. Presently, new, "environmentally compliant" chemical strippers are used in combination with non-chemical methods, such as sanding.

A number of resin manufacturers are currently developing low/no VOC curable resin formulations including, high solids, blocked isocyanate polyurethanes and aqueous-based polyurethane dispersions. These emerging resins possess certain advantageous attributes, but not without specific drawbacks. High solids formulations use low VOCs and provide equivalent performance to low solids urethanes, but cannot be applied using spraying techniques. Blocked isocyanate polyurethanes also use low VOCs and have low toxicity levels and good properties. These materials however, must be cured at elevated temperatures around 150 to 200° C., which is not practical in most applications, for example in coating automobiles. Aqueous based polyurethanes use no VOCs, are nontoxic and easy to apply via spraying. To date, however, these polyurethanes have not provided the properties required to meet military specifications, such as adhesion and moisture-resistance, desired for high performance applications.

Polyesters have emerged as promising candidates for inclusion as components in advanced aircraft coatings. Polyesters are polymers formed by the reaction of aliphatic or aromatic polyol monomers with aromatic or aliphatic diacids in the presence of catalyst, usually, metallic acetates, such as calcium acetate. Polyesters can provide a combination of useful properties including: clarity, transparency, absence of color, flexibility, excellent adhesion to most substrates, abrasion-resistance, water-resistance, fuel and oil-resistance, UV-resistance, weather-resistance, variable hardness (from elastomer to tough plastic), moderate cost, low temperature flexibility and availability as variable molecular weight, ester-endcapped, difunctional prepolymers.

Polyester polymers cannot be used as curable resins themselves, however, since their functionality is not conducive to the formation of hard, cross-linked structures. To be used advantageously as advanced coatings, polyester polymers must first be functionalized with reactive groups, such as hydroxyl groups, and then cured by chemical reaction with other comonomers, such as polyurethane diisocyanate monomers, into hard, tough polymer resins that can be used as protective coatings. Hydroxy-functional, polyester-based reactive prepolymers are frequently selected for use as components in polyurethane coatings over polyether and other type, polymers since they typically impart superior solvent-resistance, mechanical toughness and clarity to the coating and do not yellow upon exposure to intense UV light.

The major problems associated with the use of polyester-derived polyurethanes have involved the requirement for addition of substantial quantities of flammable, toxic solvents to polyurethane coating formulations to lower viscosity sufficiently for spray-painting operations. Another problem involved the use of toxic, irritating and volatile diisocyanate monomer components as major components in the polyurethane coating. The vapors that evolve from polyurethane operations may cause serious injury to workers breathing the fumes if they do not wear protective equipment.

A number of polyester-polyurethane coating manufacturers have been actively pursuing the development of low VOC and no VOC polyurethane curable resin formulations. To date however, none of these resins have exhibited the required processability or properties for use in e.g., automotive coatings.

Accordingly, what is needed are high performance curable resin compositions that contain no or substantially no VOCs and that have properties suitable for use in e.g., adhesive, coating and sealing applications, and which can be removed by use of an agent that readily, effectively and safely removes such curable resin compositions upon demand. In the case of coatings, it is desired that such compositions cure to a hard, cross-linked structure.

SUMMARY OF THE INVENTION

It has now been discovered that enzyme degradable polymers possess properties that, when combined with particular end-groups and catalysts, form curable resin compositions that are readily enzyme degradable.

The present invention provides high performance curable resin compositions that contain no or essentially no volatile organic components ("VOCs"), and, once cured, are effectively removed by enzyme solutions upon demand. The resin compositions of the present invention are particularly useful in forming high performance coatings.

The curable resin compositions of the present invention comprise (i) at least one vinyl dioxolane ("VDO") end-capped oligomer, wherein the vinyl dioxolane end-capped oligomer comprises at least one enzyme degradable segment, and (ii) at least one catalyst to initiate polymerization of the oligomer, to form an enzyme degradable polymer.

Preferred vinyl dioxolane monomers for use in the present invention are selected from substituted or unsubstituted vinyl hydroxy alkyl dioxolanes and vinyl carboxy alkyl dioxolanes, Preferably these vinyl dioxolane monomers have from 2 to about 10 carbons. Most preferably, the vinyl dioxolane monomer is 2-vinyl-4-hydroxybutyl-1.3-dioxolane (HBVD) or 2-vinyl-4-hydroxymethyl-1,3-dioxolane (HMVD).

Enzyme degradable oligomers useful in the practice of the present invention include: enzyme degradable segments derived from polyesters, polyhydroxy butrate valerate (PHVB), polylactic acids, cellulose, cellulose derivatives, nylons, acrylates, polyurethanes, and copolymers thereof. One preferred enzyme degradable oligomer comprises a polyester segment. The term "polyester" as used herein also includes polymers which are not made up fully of polyester linkages. For example, other linkages which may also be present in a vinyl dioxolane end-capped, enzyme degradable polyester oligomer of the present invention, depending upon ingredients used and reaction conditions, include those having isocyanate, cyclohexane and amide linkages along the backbone. Aliphatic polyester segments are particularly preferred. As used herein, the term "aliphatic" includes "cycloaliphatic" and saturated and unsaturated groups.

Aliphatic polyester segments are preferred over aromatic polyester segments in preparing the enzyme degradable oligomers of the present invention, particularly in forming colorless coatings, even though aromatic polyester groups are considerably more reactive than the aliphatic polyester groups for a number of reasons. Coating products made from aromatic polyesters suffer the disadvantage that they degrade more easily than do those prepared from aliphatic polyesters, especially when exposed to UV light. The higher resistance of products prepared from aliphatic polyesters to UV light-induced degradation means that coatings based on them have better yellowing and chalk resistance than those based on aromatic polyesters.

Figure 1:
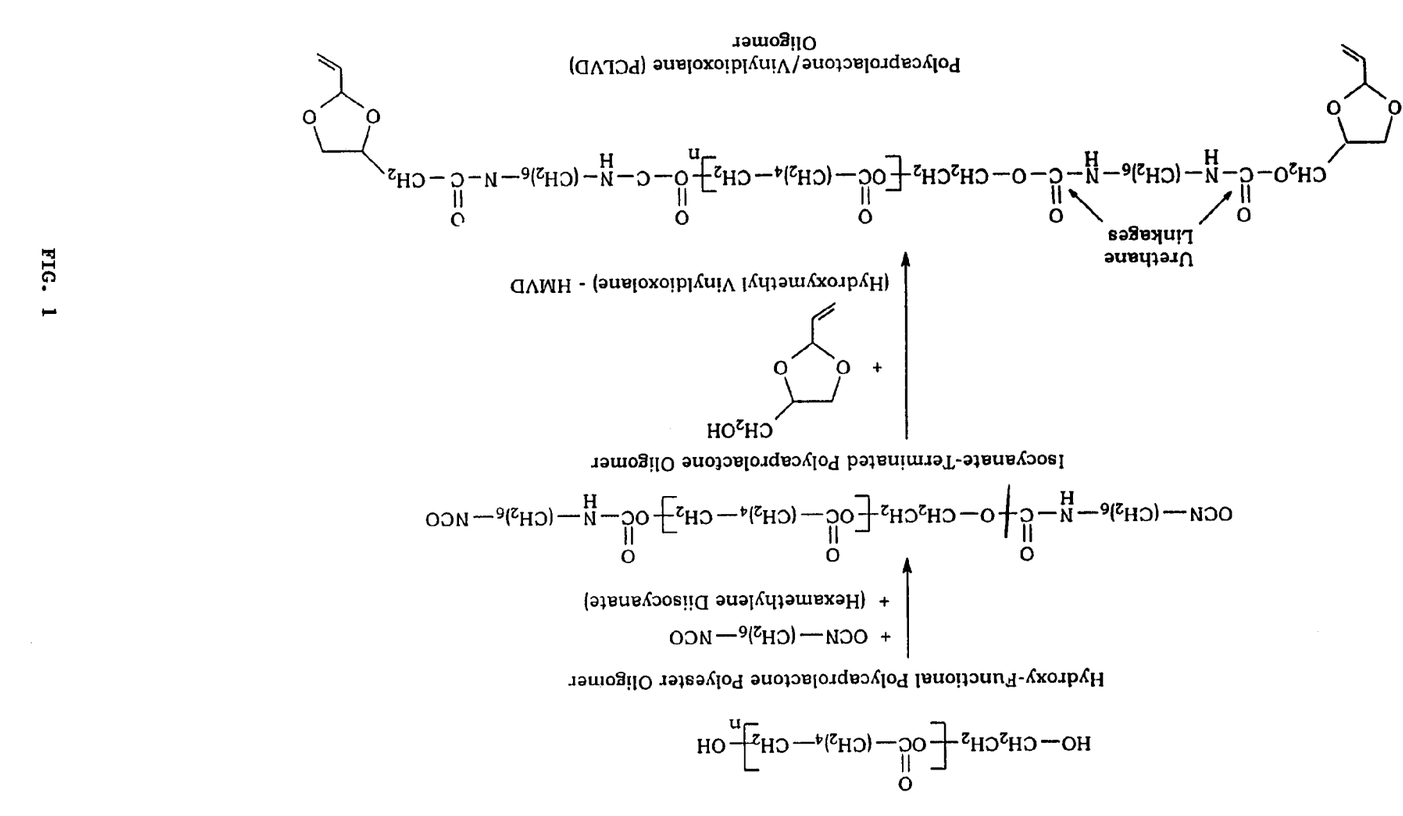
FIG. 1 shows the synthesis of another preferred enzyme degradable, PCLVD oligomer for use in the present invention.

One such particularly preferred polyester oligomer comprises a polycaprolactone. One preferred enzyme degradable VDO endcapped polycaprolactone oligomer is derived from the ring opening polymerization of an e-caprolactone. This is illustrated in FIG. 1.

Catalysts useful in polymerizing the oligomer to form the enzyme degradable polymer may be air, thermal or LW cure catalysts. UV cure is particularly desirable in some applications, because it has been found to dramatically reduce the cure time (from about 1 hour with thermal cure to about 1 minute with UV cure) without compromising the properties of the cured resin. Peroxides, cobalt (Co) and combinations of peroxides and cobalt are suitable as both thermal and air cure catalysts. A preferred thermal cure catalyst is a peroxide combined with at least one transition metal soap, such as Co, Mn or Al, which act as promoters. Additionally, dimethyl aniline, a peroxide accelerator, may be included in the catalyst composition. UV cure catalysts are generally photoinitiators, and preferably are alpha hydroxyketone type photoinitiators.

In some embodiments, the curable resin further comprises at least one reactive diluent, which may be added to obtain desired properties, e.g., a sprayable curable resin, a desired degree of crosslinking, increased flexibility or enhanced water-repellence. Some examples of reactive diluents suitable in the present invention include vinyl dioxolanes, such as HMVD and HBVD, methyl ether derivatives of HMVD and HBVD, unsubstituted vinyl dioxolane, alkylated vinyl dioxolane, diethylene glycol diacrylate (DGD), trimethylopropane triacrylate (TMPTA), and blends thereof, DGD is particularly preferred. These reactive diluents are added in amounts ranging from about 10% to about 50% by weight of the composition.

The cured resin compositions of the present invention may be removed from the surface of a coated object by an enzyme, which degrades the enzyme degradable segment. Such enzymes include those found in the environment and those that are commercially available. In one preferred embodiment, the enzyme degradable repeat unit is a polyester, or even more preferably a polycaprolactone, and the removal enzyme is a lipase. Most preferably, the enzyme is lipase-B, extracted from *Candida Antarchca,* such as Novozym 435 or Novozym 525.

In one embodiment, the enzyme is sprayed on the cured resin as an aqueous concentrate solution, and the cured resin is removed after about 24 hours with only a single application of the enzyme. However, the cured resin may be removed in less than one hour by the use of environmentally compliant water soluble softening agents, such as benzyl alcohol. In other embodiments, after applying a removal enzyme to degrade the cured resin, the resin may be removed, e.g., by use of fluid and/or air flows. In yet other embodiments, additional steps, e.g., scraping, may be taken to aid in the removal process. Accordingly, "degrading" the cured resin in the case of a coating is understood in the present invention to mean that a cured resin is converted from a hard, tenacious structure to a friable, brittle, breakable or a softened and swelled gelatinous matter that is readily removable as such or with the aid of a water flow, air flow and/or application of a scraping motion.

The high performance curable resin and complementary enzyme removal system minimizes environmental impact at every stage of the curable resin's life cycle. In accordance with the present invention, the selectively degradable linkage of the curable resin is incorporated during synthesis of the resin, and it remains dormant until purposely activated by exposure to an environmentally compliant enzyme concentrate. Once activated, in particularly preferred embodiments, the cured resin undergoes rapid and efficient degradation, making it possible to remove the cured resin without disturbing substances underlying the cured resin. For example, in furniture coating applications, this system makes it possible to rinse, dry and recoat the furniture immediately, without having to surface-treat and reapply the base coatings, should they be left intact. Enzyme-stripped, used furniture coating waste material is 100% biodegradable and can be biodegraded into harmless products and reintroduced into the environment without hazard. Thus, applications of the curable resin and the cured resin removal system provide a cost-effective, "cradle-to-grave" environmentally compliant alternative to current curable resin applications that require the use of VOC's in their application and ozone-depleting solvents in their removal via chemical stripping.

The environmentally-compliant, "cradle-to-grave", no VOC curable resin provided herein will find application in military and commercial aircraft, spacecraft, ships, automobiles, building structures, industrial equipment and electronics. The curable resin of the present invention presents an environmentally acceptable alternative to solvent-based polyurethane, acrylic, polyester, epoxy and other coating systems that require hazardous volatile solvents during both application and removal. Furthermore, these curable resin compositions can be used, e.g., in interior coating applications, where generation of toxic and/or hazardous vapors must be avoided.

DETAILED DESCRIPTION OF THE INVENTION

The present invention provides a curable resin composition that contains no or essentially no volatile organic components ("VOCs"), and that comprises (i) at least one enzyme degradable, vinyl dioxolane (VDO) end-capped oligomer, wherein the vinyl dioxolane end-capped oligomer comprises at least one enzyme degradable segment, and (ii) at least one catalyst to initiate polymerization of the oligomer thereby forming an enzyme degradable polymer.

Vinyl dioxolane monomers used in forming the curable resin compositions of the present invention have the formula:

wherein $R_1$, is an alkyl group preferably having from about 1 to 10, and more preferably no more than about 6 carbon atoms. $R_2$, $R_3$, $R_4$ and $R_5$ may be the same or different and each represents hydrogen or an alkyl group, having from about 1 to 10, and more preferably having from about 1 to 4 carbon atoms. Most preferably $R_2$, $R_3$, $R_4$ and $R_5$ are hydrogen.

The vinyl dioxolane monomers may be either substituted or unsubstituted. More specifically, the vinyl dioxolane monomers for use in the present invention are preferably selected from substituted or unsubstituted vinyl hydroxy alkyl dioxolanes and vinyl carboxy alkyl dioxolanes, which have from 2 to about 10 carbons. Particularly useful as vinyl dioxolane monomers in the present invention are 2-vinyl-4-hydroxybutyl-1.3-dioxolane (HBVD) and 2-vinyl-4-hydroxymethyl-1,3-dioxolane (HMVD).

The vinyl dioxolane monomers for use in the present invention are readily made by known methods, e.g., by condensing an unsaturated aldehyde, such as acrolein, with an appropriate 1,2-diol or triol, such as glycerol, in the presence of an acidic catalyst, such as p-toluenesulfonic acid. Such substituted vinyl dioxolane monomers are autooxidizable, that is, on exposure to the air the monomer undergoes a cross-linking reaction. The mechanism of cure has been reported to involve a ring-opening reaction in the presence of air and catalyst, forming pendant hydroxyl groups (which contribute strong adhesive properties) and polymerizing the vinyl group into a highly cross-linked, hard structure. Accordingly, in forming substituted vinyl dioxolane end-capped polyurethane oligomers for use in the present invention, care must be taken to avoid the use of reactants which cause premature opening of the ring. For example, the substituted vinyl dioxolane monomers should be stable to selected reaction catalysts for formation of the vinyl dioxolane end-capped, enzyme degradable oligomers. Preferred vinyl dioxolane monomers are stable in the presence of the catalyst systems of the present invention.

HMVD and HBVD are readily synthesized from the reaction of low-cost starting materials. For example, they may be made by condensing an unsaturated aldehyde, such as acrolein, with an appropriate 1,2-diol or triol, such as glycerol or 1,2,6-propane triol, in the presence of an acidic catalyst, such as p-toluenesulfonic acid. This synthesis is shown below:

In the case of HMVD, n=0 and of HBVD, n=3.

Vinyl dioxolanes suitable for use in the present invention are described for example, in U.S. Pat. No. 3,010,923 (the '923 patent) the teachings of which are incorporated by reference, which disclosed substituted vinyl dioxolane compounds for coating applications which contain a plurality of 2-vinyl-1,3-dioxolane groups. Although the '923 patent taught that the coating compositions disclosed therein can be applied in aqueous media, the '923 patent taught that spraying of the disclosed compositions is achieved by diluting with a volatile organic solvent such as toluene. See, e.g., column 15, lines 26–29 and lines 40–49. Furthermore, it appears that the only coating composition reported to be free of solvent suggested in the '923 patent can be found in Example 68. See also related U.S. Pat. Nos. 3,010,918; 3,055,766; 3,058,933; and 3,245,927.

Preferred substituted vinyl dioxolane monomers for use in forming vinyl dioxolane end-capped polyester prepolymers for use in the coating compositions of the present invention have a rapid rate of reaction with the alkyl ester component; are low in volatility and toxicity; and provide coatings having transparency and appropriate color which cure in air at room temperature in presence of a catalyst.

Examples of suitable enzyme degradable oligomers for use in the present invention include those having segments derived from polyesters, polyhydroxy butrate valerate (PHVB), polylactic acids, cellulose, cellulose derivatives, nylons, acrylates, polyurethanes, and copolymers thereof.

One skilled in the art can readily select in accordance with the teachings herein enzyme degradable segments for use in the curable resin compositions of the present invention. Enzyme degradable polymers are known in the art, e.g., polyesters.

The biodegradability of polyesters, including polycaprolactone (PCL), has been reported. Early work by Postts et al. (J. E. Postts et al., (1972) "An Investigation of the Biodegradability of Packaging Plastics", Office of Research and Monitoring, U.S. Environmental Protection Agency, Washington, DC, REP. EPA-R2-72-046, pp. 22–24) showed that PCL supports the growth of a mixture of fungi and that PCL in the molecular weight range from 7,000 to 35,000 g/mol degraded readily when exposed to various bacteria and yeasts. Benedict et al. (C. V. Benedict et al. (1983), *J. Appl. Polym. Sci.*, 28, 327–334; C. V. Benedict et al., (1983), *J. Appl. Polym. Sci.*, 28, 335–342) also conducted numerous studies on PCL degradability. It was shown that the enzymatic degradation of PCL gives lower $M_n$ fractions and that the degradation rate is strongly influenced by the organism or mixed culture used as well as the crystallinity of PCL. Nishida and Tokiwa (H. Nishida et al., *J. Environ. Polym. Deg.* 1, No. 3, 227–233) have assessed the capacity of various natural environments for PCL degradation. They found that PCL-degrading microorganisms and enzymes are widely distributed over all sample environments. Indeed, the percentage of PCL-degrading microorganisms is in the range of about 0.1 to 10. Tokiwa et al. (Y. Tokiwa et al., (1990) in J. E. Glass and G. Swift (Eds.), "Agriculture and Synthetic Polymers Biodegradability and Utilization," ACS Symposium Series 433, *American Chemical Society*, Washington, DC, pp. 136–148) reported a study which involved the lipase catalyzed hydrolysis of PCL based urethanes. In these studies, the degradation of polyurethanes prepared by reactions of PCL-diol with diphenylmethane-4,4'-diisocyanate (MDI) was evaluated based on the total organic carbon generated. It was reported that the R. delemar lipase was able to degrade polyurethanes to various extents that contained PCL-diols with $M_n$ values from 530 to 3,000 g/mol, and that lower PCL segment length in the polyurethane resulted in slower biodegradation rates. Lastly, work by Mukai et al. showed that the lipases from Rhizopus delemer, Rhizopus arrhizus, Mucor javanicus and Pseudomonas fluorescens are active in degrading PCL.

Preferred enzyme degradable oligomers for use in the present invention comprise at least one polyester segment. Segments derived from the polymers polycaprolactone, polyethylene succinate, polyethylene adipate and polyhexamethylene succinate are particularly preferred.

One particularly preferred VDO end-capped, enzyme degradable oligomer in accordance with the present invention comprises a polycaprolactone and the present invention will be illustrated in detail by use of polycaprolactones. However, it is not intended to limit the scope of the present invention thereby.

Figure 2:
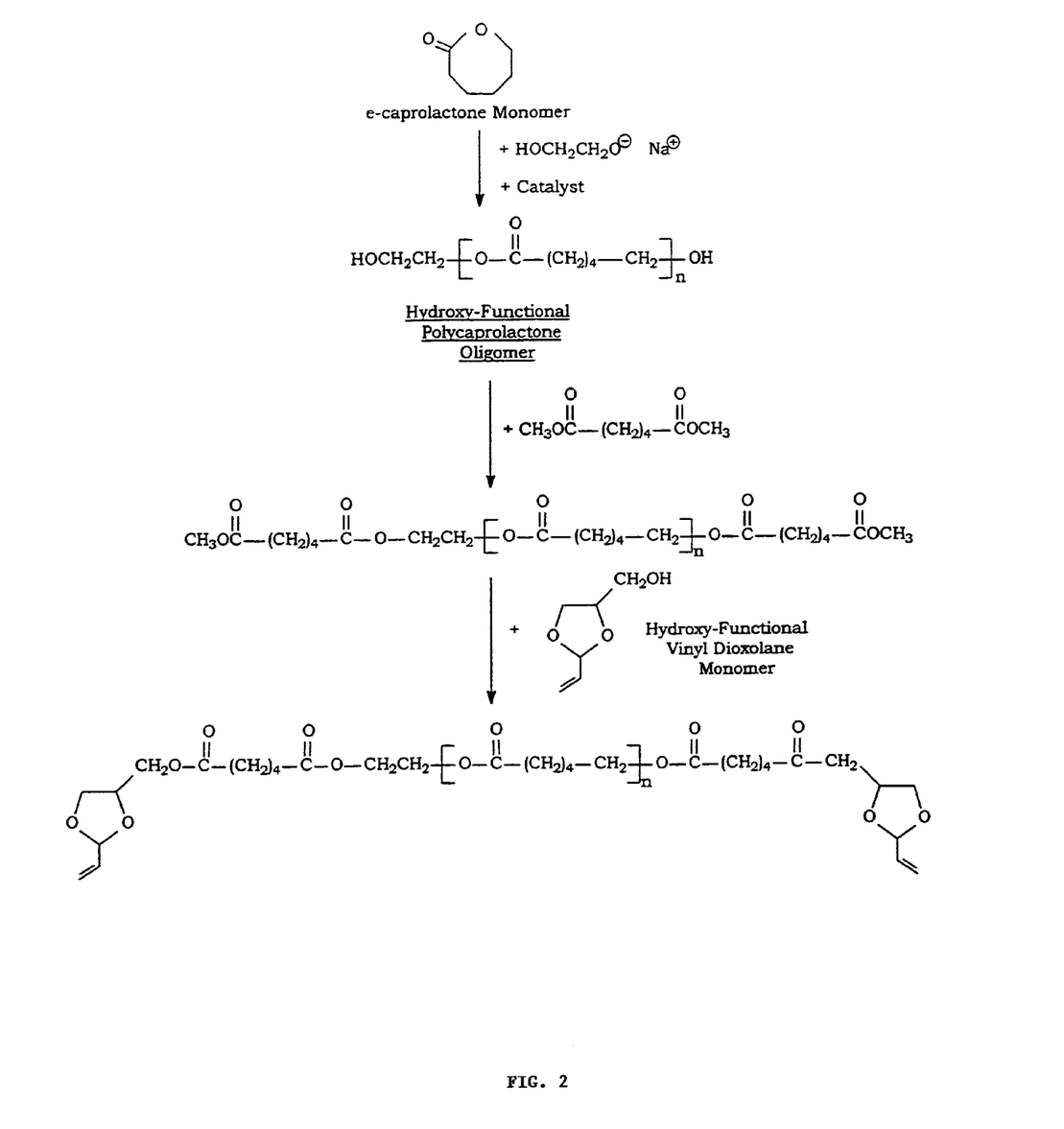
FIG. 2 shows one preferred enzyme degradable vinyl dioxolane endcapped polycaprolactone (PCLVD) oligomer, prepared using enzyme degradable ester linkages, in accordance with one embodiment of the present invention.

FIGS. 1 and 2 lay out the reactive steps leading to the production of polycaprolactone vinyl dioxolane oligomers useful in the present invention.

Preferred polyester oligomers, e.g., polycaprolactone oligomers, for use in forming vinyl dioxolane end-capped, enzyme degradable oligomers for use in the coating compositions of the present invention have a rapid rate of reaction with the selected vinyl dioxolane monomer; are low in volatility and toxicity; provide coatings having transparency and appropriate color which cure at room temperature in presence of a catalyst; and, in particularly preferred embodiments, react to form spray-coatable vinyl dioxolane end-capped, enzyme degradable oligomers.

Enzyme degradable polycaprolactone oligomers reactive with VDO monomers are made by methods commonly known in the art. Generally, the hydroxy-functional polycaprolactone oligomer is reacted with functionalizing groups, preferably isocyanate or ester groups. For example, in the embodiment shown in FIG. 1, a hydroxy function polycaprolatone oligomer is reacted with an ester functionalizing group to provide ester end-caps reactive with VDO monomers. In the embodiment shown in FIG. 2, a hydroxy functional polycaprolactone oligomer is reacted with an isocyanate to form isocyanate end-capped oligomers reactive with VDO monomers. In both cases the resultant VDO end-capped, enzyme degradable oligomers are useful in the practice of the present invention.

In one embodiment of the present invention, hydroxy-functional polycaprolactone (PCL) oligomers are formed by the catalyzed ring-opening reaction of e-caprolactone monomers using a hydroxy-functional anionic initiator. One such hydroxy functional hydroxy functional PCL oligomer is shown below:

wherein each $R_6$ to $R_7$ is independently hydrogen or an unsubstituted or substituted alkyl group having from 1 to 5 carbon atoms; each $R_8$ to $R_{11}$ is independently hydrogen or methyl; and n is from 1 to about 100.

Hydroxy-functional anionic initiators useful in the present invention include sodium methoxide and ethylene glycol monoalkoxide ($HOCH_2CH_2O$—$K^\oplus$) The reaction using ethylene glycol monosodium methoxide is illustrated below:

e-caprolactone Monomer

+ HOCH$_2$CH$_2$O$^\ominus$Na$^\oplus$
+ Catalyst

HOCH$_2$CH$_2$$-$$\left[\text{O}-\overset{\overset{\text{O}}{\|}}{\text{C}}-(\text{CH}_2)_4-\text{CH}_2\right]_n$OH wherein n is preferably in the range of about 1 to 100. The value for n is selected on the basis of viscosity (wherein lower n values are associated with lower viscosities), crosslink density (wherein lower n values are associated with higher crosslink density) and toughness (wherein higher n values are associated with greater toughness). In many applications utilizing the curable resin compositions of the present invention, properties associated with a low range of viscosity are desirable. Thus, for such uses, it is preferred that the polycaprolactone have molecular weights up to about 2500 and lower. The types of caprolactones useful in the present invention are epsilon hydroxy-functional polycaprolactone oligomers.

Hydroxy-functional polycaprolactone (PCL) oligomers produced, are functionally not conducive to the formation of hard, crosslinked structures, properties that are useful in forming coatings. To be advantageously used as advanced coatings, PCL oligomers are first endcapped with reactive groups. However, when used as sealants and adhesives, the formation of hard, crosslinked structures is not required, but, rather, a flexible cure to form soft, rubbery structures is preferred. Thus, these products would made by modifying the PCL polymer molecular weight, type and formulation to obtain the required tackiness, in the case of adhesives, and elasticity, in the case of sealants.

One especially preferred caprolactone oligomer for use in forming the enzyme degradable VDO end-capped oligomers for use in the present invention is shown below:

wherein $R_6$ to $R_{11}$ and n are as defined above; and $R_{12}$ and $R_{13}$ are functional end-capping groups reactive with VDO monomers. The polycaprolactone preferably has a molecular weight up to about 2500 g/mole.

End-capping of the hydroxy-functional polycaprolactone oligomer with ester groups ($R_{12}$ and $R_{13}$) having from about 5 to about 10 carbon atoms is particularly preferred, and end-capping of the hydroxy-functional polycaprolactone oligomer with isocyanate groups ($R_{12}$ and $R_{13}$) having from about 6 to about 15 carbon atoms is particularly preferred.

The endcapped PCL oligomer is then reacted with vinyl dioxolane monomers, to form an enzyme degradable, vinyl-dioxolane end-capped PCL oligomer. The reaction of ester and diisocyanate endcapped PCL oligomers with preferred hydroxy-functional vinyl dioxolane monomers is shown in FIGS. 1 and 2 respectively.

The progress of the reaction of the VDO and the end-capped PCL oligomer to form VDO end-capped, enzyme degradable PCL oligomers of the present invention can be monitored by infrared spectroscopy (IR). The IRs give valuable information as to what infrared wavelengths the peaks of interest appear for each material and, with this knowledge, the subsequent appearance/disappearance of these peaks can be monitored to follow the reaction.

Determination of the reactivities of the diisocyanate end-capped PCL oligomer with the vinyl dioxolane may be monitored by the appearance/disappearance and relative intensity changes of absorption peaks in the infrared spectra of the reaction solutions with time as described in Table 1 below. Infrared spectral analysis systems commercially available may be used. Samples of the vinyl dioxolane monomers and at least one enzyme degradable polycaprolactone segment were placed in a sealed IR cell and the cell could then be handled with no chemical hazard risk to the IR operator.

TABLE 1

Infrared Spectral Changes During Reaction Of Diisocyanate And Vinyl Dioxolane

| Absorption Peak Wavelength (cm −1) | Absorption Peak Assignment | Expected Peak Intensity Behavior | Comments |
|---|---|---|---|
| 3330 | =NH or —OH stretch | Increase | Intensity increase would be attributed to formation of urethane structure [—N(H)—C(O)—O—] |
| 2270 | —N=C=O asymmetric stretch | Decrease | Decrease indicates isocyanate groups are undergoing a reaction |
| 1720–1690 | —C=O stretch | Increase | Increase due to the formation of the urethane structure [—N(H)—C(O)—O] |
| 1525 | —N—C=O or C=C— stretch | Increase | Increase due to —N(H)—C=O group which would increase with formation of urethane groups |
| 1470–1430 | =CH$_2$ ip | Constant | The absorption is due to the vinyl group and should remain constant during PVD reaction |

TABLE 1-continued

Infrared Spectral Changes During Reaction Of Diisocyanate And Vinyl Dioxolane

| Absorption Peak Wavelength (cm −1) | Absorption Peak Assignment | Expected Peak Intensity Behavior | Comments |
|---|---|---|---|
| 1237 | —C—N— stretch | Increase | Increase due to formation of urethane structure [—N(H)—C(O)—O] |
| 990, 942 | —C—O—C— stretch | Constant | This stretch is due to the dioxolane ring system and should remain constant as the ring remains closed during PVD reaction |

Comparisons were made between spectra obtained soon after reactant mixing and at various times during the reaction period. The main peaks of interest appeared at 2273 and 1720 to 1690 cm−1, assigned to the —N=C=O asymmetric stretch of the isocyanate group and —C=O stretch of a urethane structure, respectively. The disappearance of the peak at 2273 cm$^{-1}$ and appearance of a peak at 1720 to 1690 cm$^{-1}$ is indicative of the isocyanate group undergoing a reaction with the hydroxy group of the vinyl dioxolane to form the desired urethane linkage. The relative intensity changes in these peaks can be used to measure the progress of the urethane formation reaction with time. The appearance of an absorption peak at 3330 cm−1, due to the =N—H stretch of the urethane linkage, is also used to determine reaction success. The 1,3-dioxolane ring should remain intact throughout all the reactions and can be monitored based on the absorption peaks at 990 and 942 cm−1 remaining approximately constant in intensity with time.

Figure 3:
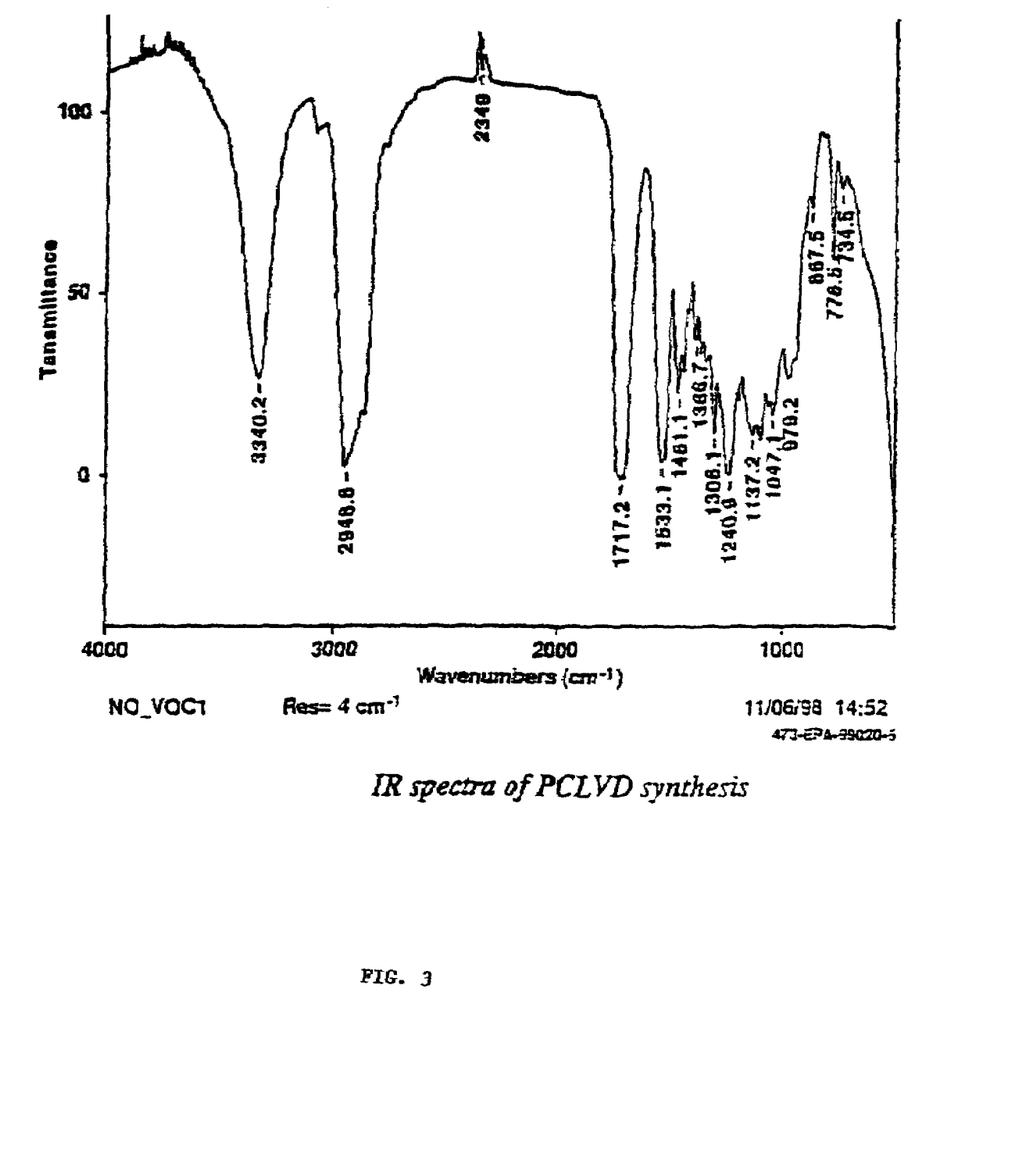
FIG. 3 shows an exemplary IR spectra of PCLVD oligomer synthesis.

A Representative IR spectrum obtained during the PCLVD synthesis showing the progress of the reaction is shown in FIG. 3.

Vinyl dioxolane end-capped PCL curable resins are particularly suitable for forming enzyme degradable coating compositions in accordance with the present invention, because they provide coatings having desirable properties. Overall, the resulting cured PCL based resins are hard, adherent, smooth, glossy and durable. The PCL oligomers, in particular, possess many useful properties including: clarity, transparency, absence of color, flexibility, excellent adhesion to most substrates, abrasion-resistance, water-resistance, fuel and oil-resistance, UV-resistance, weather-resistance, variable hardness from elastomer to tough plastic (wherein the hardness is controlled by varying crosslink density and the amount and type of difunctional vs. trifunctional PCL backbone), moderate cost, low temperature flexibility and availability as variable molecular weight, hydroxy-endcapped, difunctional oligomers. The resins can be used in their naturally clear forms or they can be formulated with pigment into a variety of colors. A few pigments and dyes might retard the drying process, leading to cure times in the upper time ranges set forth above.

For coating applications of the curable resin compositions, it is preferred that the viscosity of the enzyme degradable, vinyl dioxolane end-capped oligomers is controlled to render the compositions sprayable. Generally, if a sprayable curable resin composition is desired in accordance with the present invention, the viscosity of the vinyl-dioxolane end-capped, enzyme degradable oligomer is typically about 1000 cps or below.

Obtaining sprayable viscosities may be accomplished selecting the appropriate combination of vinyl dioxolane monomer, enzyme degradable oligomer end-capped with functional group, reactive diluent and catalyst. For example, the molecular weight of the enzyme degradable oligomer end-capped with a functional group is taken into consideration. Lower molecular weight PCL's have associated lower viscosities. Thus, it is preferred that the molecular weight of the PCL be no more than about 2500 g/mole. In addition, the viscosity of vinyl dioxolane is taken into consideration, as well as the degree of cross-linking that the particular vinyl dioxolane is likely to provide. For example, coating compositions of the present invention prepared from HMVD tend to be higher in viscosity than similar formulations prepared using HBVD, even though HMVD is lower in viscosity than HBVD. It is believed that the higher viscosity of HMVD end-capped PCL oligomers of the present invention results from increased molecular interaction made possible by the smaller, more compact HMVD molecule.

Sprayable viscosities of the curable resin compositions may also be achieved by adding reactive diluents to the curable resin compositions. Reactive diluents suitable in the practice of the present invention generally possess the following properties: low viscosity; low volatility; presence of functional groups similar in reactivity to those attached to the vinyl dioxolane monomer so that the diluent is compatible with the catalyst formulation; and does not adversely effect properties of the cured resin. In addition, the reactive diluent is compatible with the enzyme degradable nature of the curable resin composition. Reactive diluents particularly useful in obtaining sprayable resin viscosities generally have a viscosity from about 10 to about 100 mPa·s at about 23° C.

Some examples of preferred reactive diluents include vinyl dioxolane monomers such as HMVD and HBVD, vinyl dioxolane, methyl ethers of HMVD and HBVD, alkylated vinyl dioxolanes, diethylene glycol diacrylate (DGD), trimethylopropane triacrylate (TMPTA), and blends thereof. In the practice of the present invention, DGD is a particularly preferred diluent. Also particularly useful as a reactive diluent are vinyl dioxolane monomers, since they may be incorporated simply by the addition of an excess of the vinyl dioxolane monomer during the reaction between the vinyl dioxolane and the PCL oligomer end-capped with functional groups.

The reactive diluent is present in the curable resin in amounts ranging from about 10% to about 50% by weight of the composition. More preferably, the reactive diluent is present up to about 25% by weight of the composition, and even more preferably up to about 10% by weight of the composition.

TABLE 2

Properties of Reactive Diluents

| Monomer/ Supplier | Viscosity at 23° C., mPa.s | Boiling Point or Vapor pressure | Application (as suggested by the manufacturer) |
|---|---|---|---|
| TMPTA/ Aldrich | 74 | <0.01 mm at 20° C. | NA |
| HMVD Degussa | 23 | NA | Coatings and paints |
| DGD Sartomer | 12 | NA | Coatings and paints |

When the PCL oligomer is reacted with an aliphatic diester, such as dimethyl-1,3-cyclohexane dicarboxylate, the products are a mixture of aliphatic ester-endcapped PCL oligomers. These oligomers can then be further reacted with a vinyl dioxolane monomer, such as 2-vinyl-4-hydroxybutyl-1,3-dioxolane (HBVD), in the presence of a catalyst, such as sodium methoxide. The reaction results in the formation of a resin with a PCL derived polyester backbone and vinyl dioxolane reactive endgroups (PCLVD). This resin can now be polymerized in the presence of a catalyst, such as cobalt octoate, to yield a hard, tough, durable and colorless cross-linked polymer. (See, e.g. FIG. 2) The properties of this polymer (flexibility, hardness, biodegradability) will depend upon the structure of the specific monomers and oligomers used to build the resin molecule.

To form an enzyme degradable coating of the present invention, the enzyme degradable VDO end-capped oligomer, e.g. polycaprolactone/vinyldioxolane (PCLVD) oligomer, is mixed with at least one catalyst to initiate polymerization. The catalyst may be an air cure, a thermal cure, or a UV cure catalyst.

Using a thermal cure catalyst, it is desirable that the resin compositions of the present invention typically cure between about 30 minutes and about 2 hours at temperatures between about 50 to about 150° C. to form tough, adherent, durable protective cured resins. In some embodiments, the resin cures between about 30 minutes and about 1 hour at a temperature of about 100° C.

Peroxides, cobalt and combinations of peroxides and cobalt are suitable as both air and thermal cure catalysts. A preferred thermal cure catalyst comprises a peroxide combined with at least one transition metal soap, e.g., Co or Mn or Al, as promoters. The catalyst composition may also comprise a peroxide accelerator, such as dimethyl aniline (DMA). A particularly useful catalyst composition is a mixture of from about 0.5 to about 1.5% tert-butyl peroxy benzoate (TBPB), from about 0.01 to about 0.08% Co, from about 0.1 to about 0.8% Al, and from about 0.005 to about 0.02% DMA. Even more preferably, the catalyst composition is a mixture of about 1% tert-butyl peroxy benzoate (TBPB), about 0.05% Co, about 0.5% Al, and about 0.01% DMA.

The thermal cure of a PCLVD resin mixed with various reactive diluents and the thermal cure catalyst composition discussed above was investigated and is described in Example 1 below.

Preferred UV cure catalysts are photoinitiators, and, more preferably, alpha hydroxyketone type photoinitiators. Using a UV cure catalyst, the resin compositions of the present invention desirably cure within about 30 seconds to about 2 minutes under UV irradiation to form clear, hard cured resins that are similar in appearance and performance to thermally cured coatings. More preferably, the resin compositions of the present invention desirably cure within about 1 minute under UV irradiation. The UV irradiation may be performed, for example, under an H bulb with a spectral output between about 200 to about 300 nm.

The UV cure of a PCLVD resin mixed with various reactive diluents and a UV cure catalyst composition of a 1% to 10% by weight alpha hydroxyketone based photoinitiator (Sartomer Esacure KIP100F) was investigated and is described in Example 2 below.

The resins of the present invention may alternatively be air-dried at room temperature through the use of trace quantities of cobalt and/or peroxide catalysts.

Curable resin compositions according to the present invention, once cured, are removable with an enzyme preparation. Such enzymes may be any type that is found in the environment or commercially manufactured. For example, applicable enzymes may be those released from microorganisms, bacteria, yeast and fungi, or found in the soil and in the depths of ponds.

For preliminary screening of potential enzymes, the following procedure may be utilized to obtain a more accurate measurement of the weight loss due to enzyme degradation and to readily test a large number of cured resins with potential enzmes: A sample of the cured resin is first scraped or extracted from the coating, adhesive, sealant or molded article. The sample is then placed in a vial into which a buffer may be added to maintain pH of the system, and into which an antimicrobial agent may be added. The enzyme to be tested is added to the vial, and the contents are incubated in a lab shaker at a maintained temperature, while the weight loss of the cured resins is monitored. This method is advantageous since allows for the testing of numerous enzymes at a given time. However, accuracy of such testing, as opposed to testing of the actual article, may lessen the accuracy of the results.

Example 3 lists the experimental results of degradation of various polycaprolactone based coatings using the above procedure and a number of enzymes including: PPL; CCL; PS-30; AK; MAP-10; G-1000; Lipozym-IM; Novozym 435 and 525; and immobilized PS-30 on Celite. It was found that enzymes particularly useful in stripping and degrading the PCL based curable resins of the present invention are lipases. These lipases may either be immobilized or non-immobilized. Most preferably, the enzyme is lipase-B, in either its immobilized form or in its non-immobilized form.

A number of factors are believed to affect the degradability of the cured resin compositions of the present invention. The polymer structure (i.e., whether the structure is aromatic or aliphatic or alicyclic); the physical state of the polymer (i.e., molecular weight, end group composition, and the presence or absence of additives); the degree of orientation; the degree of cross-linking; and the crystallinity are all believed to impact the curable resin's degradability. Additional factors impacting the degradation of the curable resin include: the type and concentration of the enzyme, the manner of contacting the resin with the enzyme, the pH of the system, whether the enzyme is immobilized or not, and the presence or absence of coating softening agents such as benzyl alcohol Immobilized enzymes may exhibit a time lag in degradation of the curable resins. One potential explanation for this occurrence is that the physically immobilized enzyme (protein within a polyacrylate resin) diffuses over time from the immobilized matrix. An increase in enzyme concentration may under some conditions decrease the degradation rate. While not wishing to be bound by theory, it is believed that saturation of the enzyme at the surface of the substrate may lead to steric crowding and, as a result, decrease enzyme degrading efficiency.

Properties of the curable resin composition also affect degradation. Slower degradation rates were found for resins having a relatively higher cross-link density, which is believed to impede chain cleavage.

Of the lipases, Novozym 435 and 525 (lipase-B from *Candida antartica*) was the most active in degrading the cured resin, with weight loss values between about 50–60%.

Example 4 lists the experimental results of degradation of polycaprolactone using immobilized Novozym-435.

Example 5 lists the experimental results of degradation of polycaprolactone using non-immobilized Novozym-525.

The cured resin compositions of the present invention were evaluated using the following tests.

Adhesion—ASTMD3359-78.

Hardness—Pencil Test, ASTM D-3363-92a.

Solvent Resistance: Resistance to methyl ethyl ketone (MEK), ethyl alcohol (EtOH), methyl alcohol (MeOH): 25 double rubs.

Resistance to low temperature. Coated panels were placed in freezer (0° C.) for a period of 96 hours.

The test results for various PCL curable resin compositions are set out in Example 6 below.

In general, it was found that PCLVD/DEG curable resin formulations have excellent adhesion, hardness and resistance to low temperatures. Solvent resistance was moderate for the thermally cured panels and it was excellent for the UV-cured coating formulation. This is thought to be due to higher crosslink density obtained under UV irradiation. The degree of crosslinking in thermally cured formulations can be increased by increasing the cure temperature or by increasing the cure time.

The desired properties vary for different applications. For example, while hardness is more important for coating applications, this is not necessarily the case for adhesive and sealant applications, since such structures need not be hard, crosslinked structures. Rather, a flexible cure to form soft, rubbery structures is preferred in adhesive and sealant applications. For each of these applications, specially designed formulations are prepared that exhibit the desired tackiness, in the case of adhesives, and elasticity, in the case of sealants.

Figure 4:
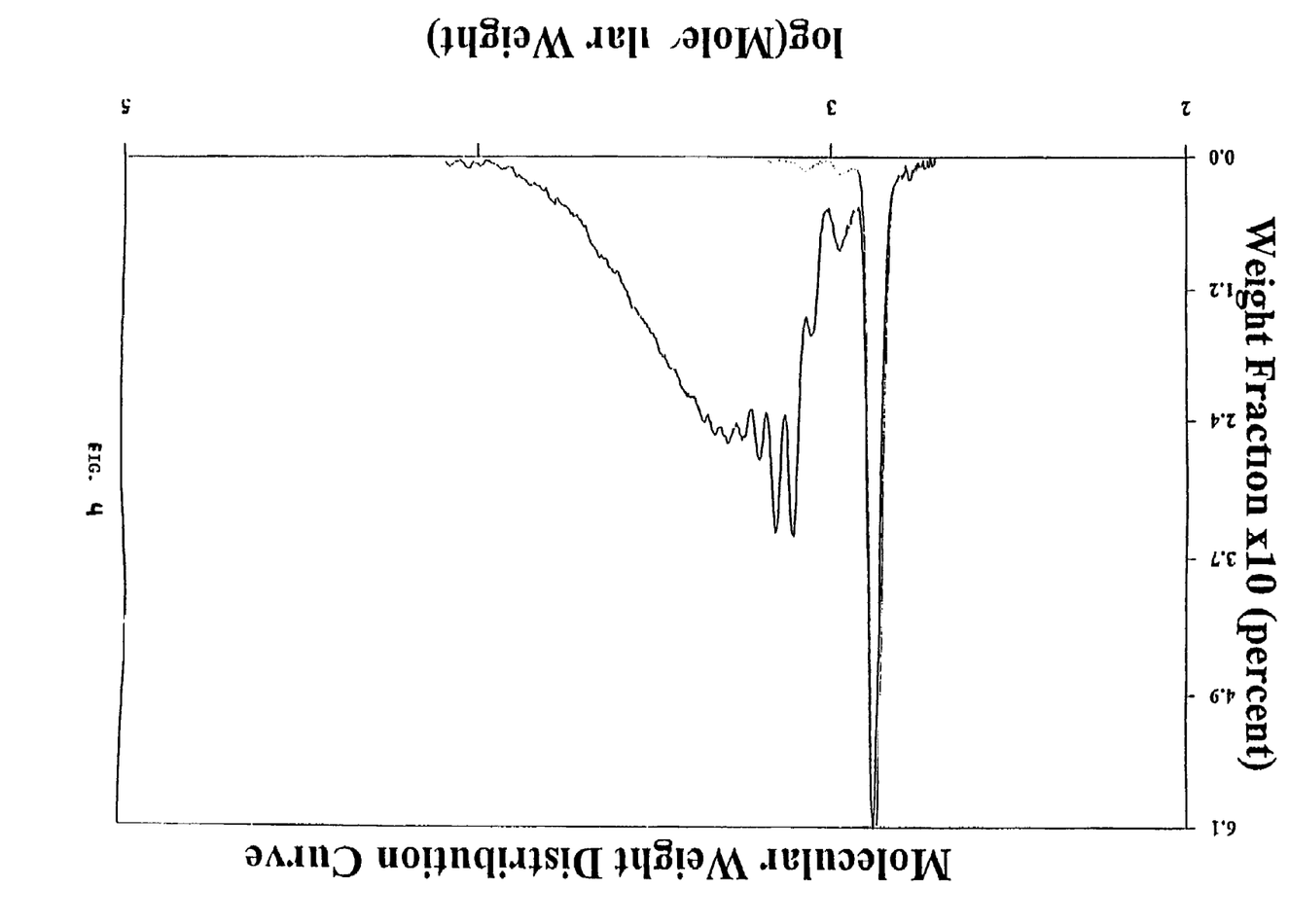
FIG. 4 shows the molecular weight distribution curve for samples of PCLVD as analyzed by gel permeation chromatography (GPC).
Figure 5:
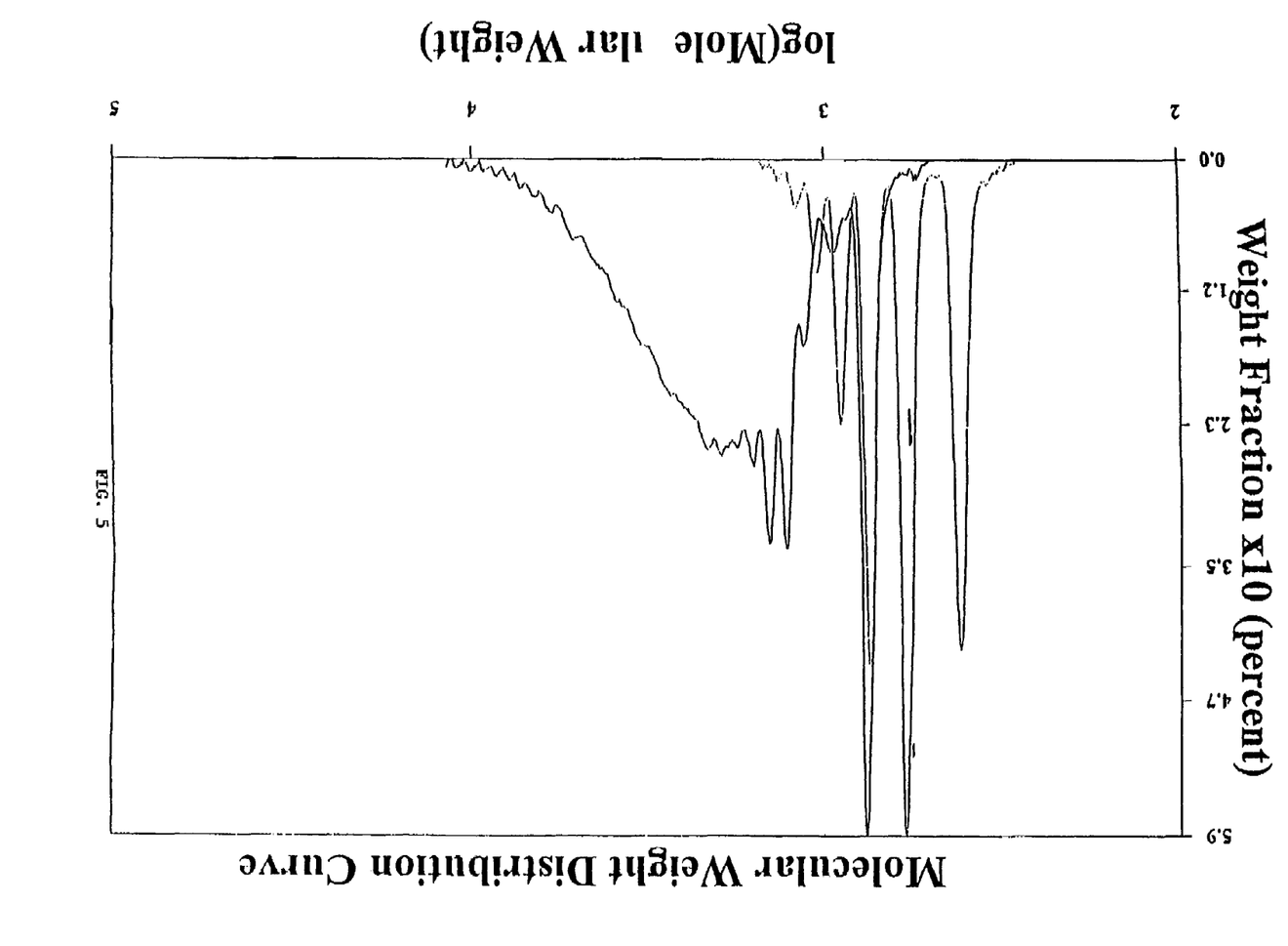
FIG. 5 shows the molecular weight distribution curve for samples of PCLVD as analyzed by gel permeation chromatography (GPC).

Samples of PCLVD were also analyzed by gel permeation chromatography (GPC). A 500 Å gel column was used and the PCLVD was dissolved in tetrahydrofuran. The flow rate was 1.2 ml/min and a column temperature was 30° C. The molecular weight distribution curves obtained are presented in FIGS. 4 and 5. The vinyl dioxolane endcapped polycaprolactone oligomer shows a major peak at approximately 750 g/mol. The results indicate that the reaction is sufficiently complete with only a small amount of polyurethane vinyl dioxolane present. The presence of this small amount of impurity did not have any adverse effect on the cure, coating or degradation properties of PCLVD.

The coating compositions of the present invention can be used as clear, unpigmented coating compositions, or they can be pigmented, using proportions well known in the art, with pigments commonly used in the coating industry, such as metal oxides, sulfides, sulfates, silicates, chromates, iron blues, organic colors, and metal flake pigments provided that such additives do not adversely affect enzyme degradability. Since some pigments retard drying, it is preferable to avoid them since the coating compositions of the present invention are air-drying materials. However, the retarding effects can be minimized as known in the art by force-drying or incorporating suitable additives.

The coating compositions can be blended with other well known film-formers such as vegetable oils, oil-modified alkyd resins, oleoresinous varnishes, alkylated urea aldehyde resins, alkylated melamine aldehyde resins, polyepoxy-polyhydroxy resins, phenol aldehyde resins, cellulose acetate, cellulose acetate butyrate, polymers, and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; and silicones again provided that such additives do not adversely affect enzyme degradability.

Other common ingredients of organic film-forming compositions can be used in the manner and in proportions well known in the art. These include plasticizers, catalysts, hardeners, anti-skinning agents and surface active agents provided that such additives do not adversely affect enzyme degradability.

The clear unpigmented compositions of this invention can be made by simply mixing the ingredients as taught in the present specification. When pigmentation is involved, a conventional pigment grinding or dispersing step is required. The coating compositions of this invention are useful for protecting and/or decorating articles made of such materials as wood, metal, ceramic, leather and fabric. The coatings of the present invention are applied by spraying, including airless and electrostatic spraying, followed by UV cure, by normal air-drying via simple exposure to air at ordinary room or atmospheric temperature, or by force-drying at a convenient temperature above ambient temperature but below a temperature which decomposition or some other objectionable results occur or a combination of both.

The coating compositions and coatings of the present invention will be further illustrated with reference to the following Examples which are intended to aid in the understanding of the present invention, but which are not to be construed as a limitation thereof.

All documents mentioned herein are fully incorporated by reference.

EXAMPLES

General

The synthesis of PCLVD and enzyme degradation testing was carried out as described below unless otherwise indicated.

Synthesis of PCLVD Using Diisocyanate Reactive Endcaps and HBVD

The synthesis of PCLVD was carried out in two stages. Isophorone diisocyanate (Bayer, Desmodur I) was first reacted with polyol X02A1 in the presence of a DABCO catalyst producing an isocyanate endcapped monomer. Hydroxy butyl vinyl dioxolane (HBVD) was then added to the reaction mixture to complete the synthesis. A typical experimental procedure for the preparation of PCLVD curable resin is presented below:

Working in a glovebag under nitrogen, the appropriate amount of vinyldioxolane, diisocyanate, polyol and polymerization catalyst was weighed out.

Diisocyanate was transferred into a 100 ml. round bottom flask with an overhead stirrer, nitrogen inlet and an addition funnel.

The reaction vessel was removed and set up inside a laminar flow hood and purged with nitrogen.

The polyol and DABCO catalyst is mixed in the addition funnel and was added dropwise to the rapidly stirring diisocyanate over a period of 30 minutes.

The reaction mixture was stirred for four hours at room temperature and was monitored closely for changes in viscosity or appearance.

Using a sealed IR cell, IR spectra of the reaction mixture was obtained.

The vinyl dioxolane was then added to the reaction mixture. The reaction was at first carried out at room temperature. The reaction vessel was then heated to 80° C. because the viscosity increased during the course of the reaction.

The progress of the reaction was monitored by the disappearance of the —N═C═O isocyanate stretch at 2270 cm−1 and the appearance of the urethane —C═O and ═N—H stretches at 1690 cm−1 and 3330 cm−1, respectively.

The reaction was complete when the —N═C═O stretch has completely disappeared.

Enzyme Degradation Testing

A sample of the cured resin is first scraped or extracted from the coating, adhesive, sealant or molded article. For adequate testing at least about a 5 ml sample of the cured resin should be scraped or extracted. The sample is then placed in a vial into which a buffer may be added to maintain pH of the system, and into which an antimicrobial agent may be added. The enzyme to be tested is added to the vial, and the contents are incubated in a lab shaker at a maintained temperature, while the weight loss of the cured resins is monitored. A typical experimental procedure for the degradation testing is presented below:

About a 5 ml sample of the cured resin is scraped or extracted. From the coating, sealant, adhesive or molded article.

The sample is placed in a vial.

A buffer, such as phosphate, is added to the vial. Preferably, the buffer has a pH between about 7 to 9, and approximately 0.5 ml of buffer is preferably added.

Approximately 0.1 ml of an antimicrobial agent, such as 2% sodium azide, is added to the vial.

Approximately 5 mg of the enzyme to be tested is then added to the vial.

The suspensions are then incubated at approximately 250 RPM at approximately 37° C. in a lab shaker and the weight loss of the cured resins is monitored.

In parallel, control experiments may be performed where no enzyme is added

Example 1

Thermal Cure of a PCLVD Composition

A PCLVD resin composition was mixed with reactive diluents and cure catalysts of the following formulation: 0.1% TBPB, 0.05% Co, 0.5% Al, 0.01% DMA. The samples were placed in a convection oven. Two temperature settings namely 50° C. and 100° C. were used in the experiments.

| Formulation | 60 min at 100° C. | 90 min at 50° C. |
|---|---|---|
| 67% PCLVD/33% DEG | Cured to hard, glossy finish | Resin thickened, not cured |
| 50% PCLVD/50% DEG | Cured to hard, glossy finish | Resin thickened, not cured |
| 50% PCLVD/50% TMPTA | Cured to hard, glossy finish | Resin thickened, not cured |
| 50% PCLVD/50% HMVD | Cured but surface is wrinkly | Resin thickened, not cured, wrinkled |

Results of experiments carried out as described above indicate that at curing temperatures of approximately 100° C., all formulations cured to hard glossy structures within an hour. The cured resins were smooth except for the formulation where HMVD was used as the reactive diluent. This particular formulation lead to a cured resin with a wrinkled surface. The effect of lowering the cure temperature was also studied. Coated panels were placed in oven at 50° C. and inspected at every 15 minutes for a total period of 90 minutes. The coatings did not cure at around 50° C. within the experimental 90 minute time frame. It was concluded that the most successful cured resins for coating applications occurred when the curable resin composition had added to it a DEG as a reactive diluent, and was cured with the above described cure catalyst formulation at approximately 100° C.

Example 2

UV Cure of a PCLVD Composition

A PCLVD resin composition was mixed with reactive diluents and cure catalysts of a 5% (by weight) alpha hydroxyketone based photoinitiator (Sartomer Esacure KIP100F). The coatings were cured under UV irradiation for under a minute. The coated panels were inspected visually for degree of cure and surface appearance.

| Formulation | Observation - 1 min under UV Irradiation |
|---|---|
| 67% PCLVD/33% DEG | Resin cured to a hard and glossy finish. |
| 50% PCLVD/50% DEG | Resin cured to a hard and glossy finish. |
| 50% PCLVD/50% TMPTA | Resin cured to a hard and glossy finish. |
| 50% PCLVD/50% HMVD | Resin cured to a hard and wrinkled finish. |

The results obtained in the curing experiments described above showed that the PCLVD based curable resin composition can be cured under UV irradiation leading to hard, glossy and smooth structures. Similar to the thermal cure results, the UV cure of the formulation with HMVD as the reactive diluent lead to a cured resin with a wrinkled surface.

Example 3

Enzyme Degradation of e-polycaprolactone

The reaction was stirred magnetically at 37° C. for 24 hours in 2 mL of 0.1 M phosphate buffer (pH 6.9). The PCL films were 0.10 mm thick and dimensions 10×10 mm.

| Experiment No. | Enzyme (Lipase) | Source | Percent Weight Loss |
|---|---|---|---|
| 1 | No enzyme | — | 0 |
| 2 | PPL | *Porcine pancreas* | 2.0 |
| 3 | CCL | *Candida rugosa* | 4.0 |
| 4 | PS-30 | *Pseudomonas cepacia* | 100 |
| 5 | AK | *Pseudomonas florescence* | 100 |
| 6 | MAP-10 | *Mucor javanicas* | 2.3 |
| 7 | G-1000 | Solvay Enzymes | 2.5 |
| 8 | Lipozym-IM | *Mucor meighii* | 14.9 |
| 9 | Novozym-435 | *Candida antartica* | 31.2 |
| 10 | Immobilized PS-30 on Celite | *Pseudomonas cepacia* | 100 |

Example 4

Enzymatic Degradation with Immobilized Novozyme-435

The incubations were carried out in accordance with the above general example, setting forth "Enzyme Degradation Testing" guidelines, at 250 RPM, 37° C. and pH 7.0

| | Enzyme Concentration | Percent Weight Loss Over Time | | |
|---|---|---|---|---|
| Coating | (mg/L) | 16 h | 40 h | 64 h |
| 50% PCLVD/50% DEG, Thermal Cure | 16 | 23 ± 7.0 | 14 ± 3.0 | 12 ± 6.0 |
| | 8 | 18 ± 5.0 | 0.0 ± 1.0 | 15 ± 5.0 |
| | 4 | 23 ± 5.0 | 5.0 ± 2.0 | 20 ± 5.0 |
| | 2 | 1.0 ± 3.0 | 5.0 ± 2.0 | 10 ± 4.0 |
| | 1 | 20 ± 6.0 | 6.0 ± 3.0 | 7.0 ± 3.0 |
| 67% PCLVD/33% DEG, Thermal Cure | 16 | 22 ± 6.0 | 0.0 ± 2.0 | 9.0 ± 4.0 |
| | 8 | 12 ± 4.0 | 0.0 ± 1.0 | 5.0 ± 2.0 |
| | 4 | 55 ± 5.0 | 37 ± 3.0 | 15 ± 3.0 |
| | 2 | 12 ± 3.0 | 9.3 ± 4.0 | 17 ± 4.0 |
| | 1 | 20 ± 5.0 | 11 ± 3.0 | 6.0 ± 2.0 |
| 67% PCLVD/33% DEG, Thermal Cure | 16 | 0.0 ± 1.0 | 10 ± 2.0 | 12 ± 3.0 |
| | 8 | 0.0 ± 2.0 | 8.0 ± 2.0 | 7.0 ± 2.0 |
| | 4 | 0.0 ± 1.0 | 0.0 ± 1.0 | 2.0 ± 3.0 |
| | 2 | 0.0 ± 5.0 | 10 ± 2.0 | 13 ± 3.0 |
| | 1 | 0.0 ± 3.0 | 0.0 ± 0.0 | 5.0 ± 1.0 |

Example 6

Test Results for PCLVD Curable Resin Compositions

| | Adhesion | Hardness | Solvent Resistance | Resistance to Temperature Change |
|---|---|---|---|---|
| 50% PCLVD/50% DEG Thermal Cure at 100° C., 60 min | Excellent Class 5 | Scratch: F Gauge: 5H | EtOh, MeOH and MEK Coating gets dull, no material loss | No change after 96 hours at 0° C. |
| 67% PCLVD/33% DEG Thermal Cure at 100° C., 90 min | Excellent Class 5 | Scratch: HB Gauge: 5H | EtOh, MeOH and MEK Coating gets dull, some material loss | No change after 96 hours at 0° C. |
| 50% PCLVD/50% DEG UV Cure | Excellent Class 5 | Scratch: 5H Gauge: F | EtOh, MeOH excellent MEK slight material loss | No change after 96 hours at 0° C. |

| | Percent Weight Loss Over Time | | | |
|---|---|---|---|---|
| Coating | 24 h | 48 h | 72 h | 96 h |
| 50% Caprolactone Prepolymer | 0.0 ± 0.0 | 60 ± 10 | 65 ± 15 | nd |
| 66% Caprolactone Prepolymer | 2.0 ± 0.0 | 4.0 ± 1.0 | 12 ± 2.0 | 10 ± 3.0 |
| 95% Caprolactone Prepolymer | 0.0 ± 0.0 | 4.0 ± 1.0 | 8.0 ± 2.0 | 7.0 ± 2.0 |

Example 5

Enzymatic Degradation with Non-immobilized Lipase Novozyme 525

The incubations were carried out in accordance with the above general example, setting forth "Enzyme Degradation Testing" guidelines, at 250 RPM, 37° C. and pH 7.0

What is claimed:

1. A curable resin composition, containing essentially no volatile organic components, comprising:
at least one enzyme degradable, vinyl dioxolane end-capped oligomer, wherein the vinyl dioxolane end-capped oligomer comprises at least one enzyme degradable segment selected from the group consisting of polycaprolactone, polyhydroxy butrate valerate (PHVB), polylactic acid, and copolymers and blends thereof, and at least one catalyst to initiate polymerization of the oligomer to form an enzyme degradable polymer.

2. The curable resin composition of claim 1, wherein the enzyme degradable oligomer comprises a polyester, a polyurethane, and copolymers and blends thereof.

3. The curable resin composition of claim 1, wherein the enzyme degradable, vinyl dioxolane end-capped oligomer comprises at least two enzyme degradable segments.

4. The curable resin composition of claim 3, wherein each of the enzyme degradable segments are identical.

5. The curable resin composition of claim 2 wherein the enzyme degradable, vinyl dioxane end-capped oligomer comprises a polyester.

6. The curable resin composition of claim 5 wherein the polyester comprises a polycaprolactone.

7. The curable resin composition of claim 6, wherein the polycaprolactone has the formula:

wherein each R is hydrogen or α-caprolactone being unsubstituted or substituted and n is from 1 to about 100.

8. The curable resin composition of claim 7 wherein n is from 1 to about 15.

9. The curable resin composition of claim 7, wherein the polycaprolactone has a molecular weight up to about 2500 g/mole.

10. The curable resin composition of claim 1, wherein the vinyl dioxolane end-caps comprise substituted or unsubstituted vinyl hydroxy alkyl dioxolanes and vinyl carboxy alkyl dioxolanes, having from 2 to about 10 carbons.

11. The curable resin composition of claim 10, wherein the vinyl-dioxolane end-caps are derived from 2-vinyl-4-hydroxybutyl-1,3-dioxolane (HBVD) or 2-vinyl-4-hydroxymethyl-1,3-dioxolane (HMVD).

12. The curable resin composition of claim 1, wherein the composition is sprayable.

13. The curable resin composition of claim 1, further comprising at least one reactive diluent.

14. The curable resin composition of claim 13, wherein the reactive diluent is present up to about 50% by weight of the composition.

15. The curable resin composition of claim 13, wherein the reactive diluent is present up to about 25% by weight of the composition.

16. The curable resin composition of claim 13, wherein the reactive diluent is present up to about 10% by weight of the composition.

17. The curable resin composition of claim 13, wherein the reactive diluent has a viscosity from about 10 to about 200 mPa.s at about 23° C.

18. The curable resin composition of claim 13, wherein the reactive diluent comprises an enzyme degradable reactive diluent.

19. The curable resin composition of claim 13, wherein the reactive diluent comprises HMVD, diethylene glycol diacrylate (DGD), trimethylopropane triacrylate (TMPTA), or a blend thereof.

20. The curable resin composition of claim 1, wherein the enzyme degradable, vinyl dioxolane end-capped oligomer comprises from about 65 to about 90 weight percent of the enzyme degradable polymer.

21. The curable resin composition of claim 1, wherein the catalyst is an air cure, a thermal cure or a UV cure catalyst.

22. The curable resin composition of claim 21, wherein the air or thermal cure catalyst is a peroxide, a cobalt composition or combinations thereof.

23. The curable resin composition of claim 22, wherein the thermal cure catalyst is a peroxide combined with at least one transition metal soap.

24. The curable resin composition of claim 23, wherein the thermal cure catalyst comprises tert-butyl peroxy benzoate (TBPB), Co, Al, and DMA.

25. The curable resin composition of claim 21, wherein the UV cure catalyst is a photoinitiator.

26. The curable resin composition of claim 25, wherein the photoinitiator is an alpha hydroxyketone type photoinitiator.

27. A coating comprising the curable resin composition of claim 1.

28. A stripper composition for the curable resin of claim 27, comprising an enzyme which is capable of degrading the enzyme degradable polymer.

29. The stripper composition of claim 28, wherein the at least one enzyme degradable segment comprises at least one polycaprolactone and the enzyme comprises a lipase.

30. The stripper composition of claim 29, wherein the lipase is immobilized.

31. The stripper composition of claim 29, wherein the lipase is lipase-B.

32. A method of providing a enzyme degradable polymer coating, the method comprising applying a curable resin composition containing essentially no volatile organic components and allowing the curable resin composition to cure, wherein the curable resin comprises:
at least one vinyl dioxolane end-capped oligomer, wherein the vinyl dioxolane end-capped oligomer comprises at least one enzyme degradable segment selected from the group consisting of polycaprolactone, polyhydroxy butrate valerate (PHVB), polylactic acid, and copolymers and blends thereof, and at least one catalyst to initiate polymerization of the oligomer to form a enzyme degradable polymer.

33. The method of claim 32, wherein the enzyme degradable oligomer comprises a polyester, a polyurethane, and copolymers and blends thereof.

34. The method of claim 32, wherein the enzyme degradable, vinyl dioxolane end-capped oligomer comprises at least two enzyme degradable segments.

35. The method of claim 33 wherein the enzyme degradable, vinyl dioxolane end-capped oligomer comprises a polyester.

36. The method of claim 35 wherein the polyester comprises a polycaprolactone.

37. The method of claim 36, wherein the polycaprolactone has the formula:

wherein each R is hydrogen or α-caprolactone being unsubstituted or substituted and n is from 1 to about 100.

38. The method of claim 37 wherein n is from 1 to about 15.

39. The method of claim 7, wherein the polycaprolactone has a molecular weight up to about 2500 g/mole.

40. The method of claim 32, wherein the vinyl dioxolane end-caps comprise substituted or unsubstituted vinyl hydroxy alkyl dioxolanes and vinyl carboxy alkyl dioxolanes, having from 2 to about 10 carbons.

* * * * *